(12) United States Patent
Xu et al.

(10) Patent No.: US 11,390,340 B2
(45) Date of Patent: Jul. 19, 2022

(54) TRACKED VEHICLE

(71) Applicants: Chongqing Vocational Institute of Engineering, Chongqing (CN); Chongqing University, Chongqing (CN); Yifei Xu, Chongqing (CN)

(72) Inventors: Hao Xu, Chongqing (CN); YiFei Xu, Chongqing (CN); Jiang Liu, Chongqing (CN); FuSheng Pan, Chongqing (CN); YuAn Chen, Chongqing (CN); Jun Yi, Chongqing (CN); Yuanyong Gong, Chongqing (CN); Yuhang Zhou, Chongqing (CN); Yuyu Dou, Chongqing (CN); Zuzheng Wu, Chongqing (CN); Bo Wang, Chongqing (CN); Hongyu Zhu, Chongqing (CN); Cheng Li, Chongqing (CN); Yu Bi, Chongqing (CN)

( * ) Notice: Subject to any disclaimer, the term of this patent is extended or adjusted under 35 U.S.C. 154(b) by 0 days.

(21) Appl. No.: 17/519,544

(22) Filed: Nov. 4, 2021

(65) Prior Publication Data
US 2022/0144356 A1 May 12, 2022

(51) Int. Cl.
*B62D 55/06* (2006.01)
*B62D 55/12* (2006.01)
*B62D 55/14* (2006.01)
*B62D 55/10* (2006.01)
*B62D 29/00* (2006.01)

(52) U.S. Cl.
CPC .............. *B62D 55/06* (2013.01); *B62D 55/10* (2013.01); *B62D 55/12* (2013.01); *B62D 55/14* (2013.01); *B62D 29/007* (2013.01)

(58) Field of Classification Search
CPC ........ B62D 55/10; B62D 55/12; B62D 55/14; B62D 55/06; B62D 55/30; B62D 55/305; B62D 55/32; B62D 55/104; B62D 29/007
USPC ............... 180/9.22, 9.25, 9.44; 305/134, 155
See application file for complete search history.

(56) References Cited

U.S. PATENT DOCUMENTS

| 2,355,456 | A | * | 8/1944 | Macbeth | ............ | B62D 55/1086 |
| | | | | | | 305/134 |
| 2,859,068 | A | * | 11/1958 | Larsson | ................. | B62D 55/30 |
| | | | | | | 305/134 |

(Continued)

FOREIGN PATENT DOCUMENTS

| CN | 205602023 | * | 9/2016 |
| CN | 205602023 | U | 9/2016 |

(Continued)

*Primary Examiner* — Anne Marie M Boehler (57) ABSTRACT

A tracked vehicle is provided. The tracked vehicle includes a frame, a driving mechanism installed in the frame, and two track wheels respectively arranged on the left and right sides of the frame. The driving mechanism drives the track wheels to rotate. The track wheel includes a track body, a first main support, a second main support and a third main support provided in the track body. The first main support, the second main support and the third main support are connected to the vehicle frame through the first, second and third connecting rods respectively. The second main support is provided with an auxiliary support frame having one end hinged to the second main support, and the other end of the auxiliary support frame is provided with a first roller contacting with the inner side of the track body.

8 Claims, 6 Drawing Sheets

(56) References Cited

U.S. PATENT DOCUMENTS

| | | | | |
|---|---|---|---|---|
| 3,789,941 | A * | 2/1974 | Robertson | B62D 49/0692 |
| | | | | 180/9.22 |
| 6,408,962 | B1 * | 6/2002 | Ryckman | B62B 1/002 |
| | | | | 180/9.22 |
| 7,520,575 | B2 * | 4/2009 | Johnson | B62D 55/12 |
| | | | | 305/144 |
| 10,124,843 | B2 * | 11/2018 | Sauvageau | B62D 55/125 |
| 11,154,766 | B2 * | 10/2021 | Maidment | B62D 51/04 |
| 11,174,608 | B1 * | 11/2021 | Sullivan | E01H 4/02 |
| 2012/0242141 | A1 * | 9/2012 | Bessette | B62D 55/24 |
| | | | | 305/142 |
| 2014/0035355 | A1 * | 2/2014 | He | B62D 55/30 |
| | | | | 305/120 |
| 2014/0138169 | A1 * | 5/2014 | Fairhead | B60G 3/20 |
| | | | | 180/9.5 |
| 2017/0291652 | A1 * | 10/2017 | Marchildon | B62D 55/108 |
| 2021/0354768 | A1 * | 11/2021 | Mancini | B62D 55/0847 |

FOREIGN PATENT DOCUMENTS

| | | | |
|---|---|---|---|
| CN | 107310646 | * | 11/2017 |
| CN | 107310646 A | | 11/2017 |
| CN | 109303994 | * | 2/2019 |
| CN | 109303994 A | | 2/2019 |

* cited by examiner

TRACKED VEHICLE

CROSS REFERENCE TO RELATED APPLICATION

This patent application claims the benefit and priority of Chinese Patent Application No. 202011249956.7 filed on Nov. 10, 2020, the disclosure of which is incorporated by reference herein in its entirety as part of the present application.

TECHNICAL FIELD

The present invention relates to the technical field of tracked vehicles, and more specifically, to a tracked vehicle.

BACKGROUND ART

With the high-speed development of modern society and science and technology, tracked vehicles are being more and more applied to various complex environments, especially in the fields of hazardous environment monitoring, unknown area detection, planet detection, rescue and search, explosion elimination and so on. The tracked vehicles can replace the workers to carry out dangerous works.

The existing tracked vehicles have strong power for getting over obstacles, but at the same time, the volume of the tracked vehicles is relatively heavy, and it is easy to generate large vibration and cannot run smoothly.

SUMMARY

The technical problem to be solved by the present disclosure is to provide a tracked vehicle that is small in volume, light in weight and can run stably without generating large vibration during running.

In order to achieve the above object, the technical scheme of the present invention is realized as follows. The tracked vehicle includes a frame, a driving mechanism provided in the frame, and two track wheels respectively arranged on the left and right sides of the frame. The driving mechanism is configured to drive the track wheel to rotate. The track wheel includes a track body, a first main support, a second main support and a third main support. The first main support, the second main support and the third main support are respectively connected with a connecting rod, and the connecting rod is connected with the frame.

One end of each of the first main support, the second main support and the third main support is provided with a transmission wheel. The other end of the first main support, the second main support and the third main support are connected to each other. The track body is wound on the transmission wheel. The second main support is provided with an auxiliary supporting frame having one end hinged to the second main support. The other end of the auxiliary supporting frame is provided with a first roller contacting an inside of the track body. A first damper is further provided between the auxiliary supporting frame and the second main support. A triangular structure is formed between the first damper, the second main support and the auxiliary support.

Further, the first main support is provided above the second main support (23) and the third main support. The second main support is provided in the track body at a position near the front end. The third main support is provided in the track body at a position near the rear end. An included angle of 60 degrees is formed between the first main support and the second main support. An included angle of 30 degrees is formed between the second main support and the auxiliary support, An included angle of 160 degrees is formed between the third main support and the first main support.

Further, the third main support is provided with a downward convex portion. The convex portion is provided with a second roller. The second roller is in contact with the inner side of the track body. The second roller has a height lower than that of the drive wheel on the third main support.

Further, the driving mechanism includes a fuel engine arranged in the vehicle frame, a fuel tank arranged on top of the fuel engine, a steering gear connected to the output end of the fuel engine, a reducer connected to the steering gear, and a first transmission shaft connected to the reducer, a universal joint having one end connected to the first transmission shaft, a second transmission shaft connected to the other end of the universal joint, a differential gear connected to the second transmission shaft and a third transmission shaft respectively connected to the two track wheels through the differential gear. The third transmission shaft is connected with the transmission wheel on the second main support and configured to drive the transmission wheel on the second main support to rotate.

Further, the frame is formed by connecting two alloy steel plates.

Further, the top of the frame is provided with a carrying plate. The rear end of the carrying plate is rotatably installed at the top position of the rear end of the frame and a second damper is provided between the front end of the carrying plate and the front end of the frame.

Further, the number of the second damper is two.

Further, an oil brake system is arranged on the transmission wheel of the second main support.

The tracked vehicle further includes a control rod rotatably mounted on the front end of the frame. The control rod is designed as a hollow structure and an operation console is arranged on the control rod.

Further, the rod body of the control rod is foldable.

The advantageous effects of the present disclosure are as follows:

In that invention, the self weight of the tracked vehicle is greatly reduced with the arrangements of the three main supports in the track body. In that invention, auxiliary supporting frame is hinged on the second main support and the first damper is arrange between the second main support and the auxiliary supporting frame, so that the vibration generated when the track vehicle crosses the obstacle is greatly reduced and more stable. The disclosure has simple structure, can effectively reduce the weight of the tracked vehicle and vibration during running, can run more stably and has good social benefits, and is worthy of further promotion and application.

BRIEF DESCRIPTION OF THE DRAWINGS

The accompanying drawings, which form a part hereof, serve to provide a further understanding of the invention. The illustrative embodiments of which and the description thereof serve to explain the invention and do not constitute an undue limitation of the invention. In the drawings.

In the drawings.

1—frame, 2—track wheel, 21—track body, 211—track inner teeth, 212—rib, 213—boss, 22—first main support, 23—second main support, 24—third main support, 241—convex part, 242—second roller, 243—connecting plate, 25—driving wheel, 251—driving tooth, 26—auxiliary support bracket, 261—first roller, 27—first damper, 28—locking mechanism, 281—threaded column, 282—nut, 283—stop ring, 284—handle, 3—connecting rod, 4—bearing plate, 5—second damper, 6—drive mechanism, 61—fuel engine, 62—oil tank, 63—steering gear, 64—reducer, 65—first transmission shaft, 66—universal joint, 67—second transmission shaft, 68—differential gear, 69—third transmission shaft, 7—control rod, 71—operating console, 8—oil brake system.

DETAILED DESCRIPTION OF THE EMBODIMENTS

Technical solutions in embodiment of the disclosure will be described clearly and completely with reference to the drawings in the embodiment of the disclosure. Obviously, the described embodiments are only a part of the embodiments of the invention, but not all of the embodiments. The embodiments in the present disclosure and the features in the embodiments may be combined with each other without conflicts. Based on the embodiments of the disclosure, all other embodiments obtained by the ordinary person skilled in the art without creative efforts fall within the scope of protection of the disclosure.

If the embodiment of the present disclosure relates to directional indications (such as on, below, left, right, front, back . . . ), the directional indications are only used to explain the relative positional relationship between the components in a specific posture (as shown in the drawings), the motion situation, and the like. If the specific posture is changed, the directional indications change accordingly.

In addition, if there are description relating to "first," "second," etc. in the embodiment of the invention, the description of "first," "second," etc. is for the purpose of description only, and cannot be understood to indicate or imply its relative importance or to implicitly indicate the number of indicated technical features. Thus, features defined with "first," "second" may explicitly or implicitly include at least one such feature. In addition, the meaning of "and/or" appearing throughout the text includes three parallel schemes, taking "A and/or B" as an example, including scheme A, or scheme B, or schemes that both A and B meet simultaneously. In addition, "multiple" refer to two or more. In addition, the technical solutions among the various embodiments may be combined with each other, but must be based on the implementation by the ordinary person skilled in the art. When the combination of the technical solutions appears to be contradictory to each other or cannot be realized, it should be considered that the combination of the technical solutions does not exist and is not within the protection scope of the disclosure.

FIGS. 1-6 are referred.

A tracked vehicle is provided in the disclosure. The tracked vehicle includes a frame 1, a driving mechanism 6 provided in the frame 1, and two track wheels 2 respectively arranged on the left and right side of the frame 1. The driving mechanism 6 drives the track wheels 2 to rotate. Each of the tracked wheel 2 includes a track body 21, a first main support 22, a second main support 23 and a third main support 24. The first main support 22, the second main support 23 and the third main support 24 are respectively connected with a connecting rod 3. Each connecting rod 3 is connected with the frame 1.

One end of the first main support 22, the second main support 23 and the third main support 24 are respectively provided with transmission wheels 25. The other ends of the first main support 22, the second main support 23, and the third main support 24 are connected to each other. The track body 21 is wound around the transmission wheels 25. The second main support 23 is provided with an auxiliary supporting frame 26 having one end hinged to the second main support 23, and the other end of the auxiliary supporting frame 26 is provided with a first roller 261 contacting with the inside of the track body 21. A first damper 27 is provided between the auxiliary supporting frame 26 and the second main supporting frame 23. The first damper 27, the second main supporting frame 23 and the auxiliary supporting frame 26 form a triangular structure.

The self weight of the tracked vehicle is greatly reduced by the arrangement of the three main supports in the track body. In the disclosure, the auxiliary supporting frame is hinged on the second main support and the first damper is provided between the second main support and the auxiliary supporting frame, so that the vibration generated when the tracked vehicle crosses the obstacle is greatly reduced and more stable.

Preferably, the left and right sides of the transmission wheels 25 respectively have one ring of transmission teeth 251. The transmission teeth 251 do not exceed the circumferential surface of the transmission wheels 25. The inside surface of the track body 21 is provided with tracked vehicle inner teeth 211 engaging with the driving wheel 25. The tracked vehicle inner teeth 211 are engaged with the driving teeth 251. In such a design, that pressure of the mesh part is greatly reduced, the wear and damage of the track body is reduced. The requirements on the material property of the track body is reduced, and the service life of the track body is improved.

Figure 6:
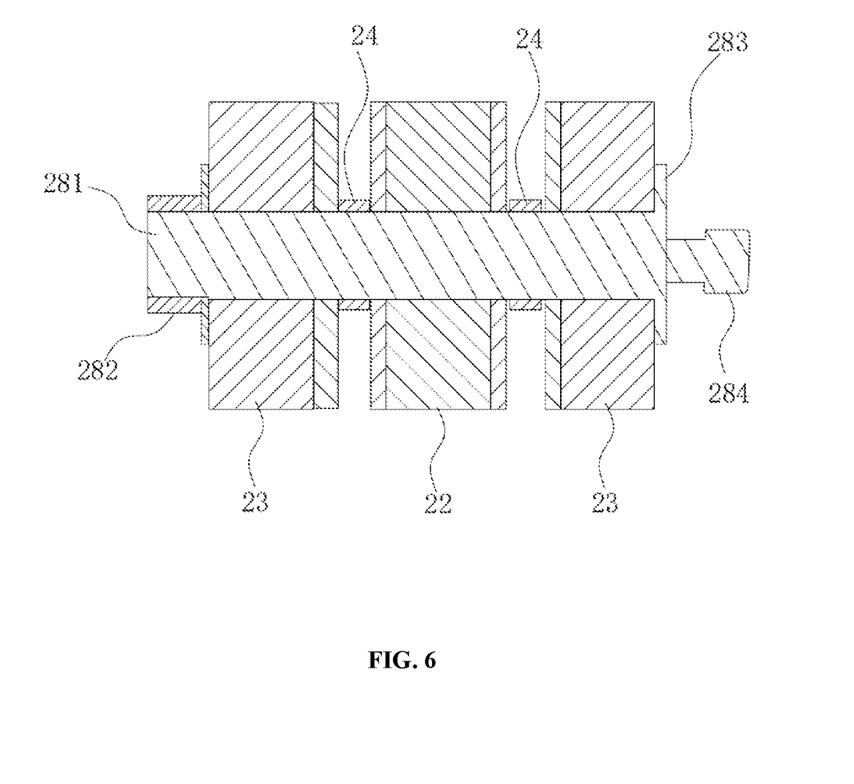
FIG. 6 is a half sectional view of a locking mechanism of the tracked vehicle according to an embodiment of the present disclosure.

Preferably, the other ends of the first main support 22, the second main support 23 and the third main support 24 are connected to each other by a locking mechanism 28. The locking mechanism 28 includes a threaded column 281 and a nut 282 screwed to one end of the threaded column 281. The other end of the threaded column 281 is provided with a stop ring 283. The threaded column 281 passes through the other ends of the first main support 22, the second main support 23, and the third main support 24, and is screwed with the nut 282 to lock the other end of the main support. In such a design, the main supports are locked under the clamping force of the retaining ring and the nut by tightening the nut. When the track wheel has a problem and needs to be disassemble and maintained, the locking mechanism can be directly opened to separate the main supports. It can effectively reduce the workload of repair and disassembly, and greatly improve the efficiency of maintenance.

More preferably, the other end of the threaded column is further provided with a handle 284 for rotating the threaded column 281. The handle 284 is provided outside the retaining ring 283. In such a design, when the threaded column is rotated, the threaded column can be driven to rotate by turning the handle, the threaded column can be disassembled manually without using other tools, and the convenience of maintenance is greatly improved.

Preferably, the other ends of the first main support 22, the second main support 23 and the third main support 24 are threadedly engaged with the threaded column 281. In such a design, that connection strength between the thread column and the main supports can be further enhanced, the connection is more secure, and the relative position between the main supports is not easy to change. The threaded column is not easy to loosen when it is subjected to vibration.

In the specific implementation, the threads on the threaded column 281 are coarse threads. In this way, the threaded column can be quickly installed and disassembled, and the threaded column has a good bearing capacity and can bear greater pulling force and impact force.

Preferably, the track body 21 is made of a high-strength plastic material, and the outer surface of the track body 21 is provided with an uneven rib 212. An elongated boss 213 is provided on the front surface of the rib 212 and on the rear surface of the rib 212. In the design, the high-strength plastic material is adopted, the damage of the track body to the road can be greatly reduced when the tracked vehicle runs on the road. The weight of the high-strength plastic is light to further reduce the weight of the tracked vehicle. In addition, that high-strength plastic has small vibration when cooperated with the transmission wheel, and the concave-convex shaped rib is arranged to make the track wheel's grip force stronger, and can be qualified for various rugged terrains.

Preferably, the inner teeth 211 of the track body are arranged in a staggered manner with the ribs 212. The bottom ends of the rear teeth of the inner teeth 211 of the caterpillar band are provided at the middle position of the corresponding ribs 212. In such a design, during the advancement process of the track wheel, the transmission wheels apply a backward force to the inner teeth of the track. The ground applies a forward force to the rib. In the invention, the position of the tooth root of the inside teeth and the rib of the tracked vehicle belt is not easy to be destroyed, and the service life of the tracked vehicle belt body is improved.

Preferably, three connecting rods 3 are provided. The middle parts of the three connecting rods 3 are respectively arranged on the frame 1. Two ends of the three connecting rods 3 are symmetrically provided on two sides of the frame 1 and are respectively connected with the first main supports 22 disposed on the track wheels 2 on both sides of the frame 1. The second main support 23 and the second main support 23 are connected in a one-to-one correspondence. The track wheels are installed on the body of the track vehicle through the connecting rod, which not only has a simple structure but also controls the relative position of the first main support, the second main support and the third main support.

Figure 5:
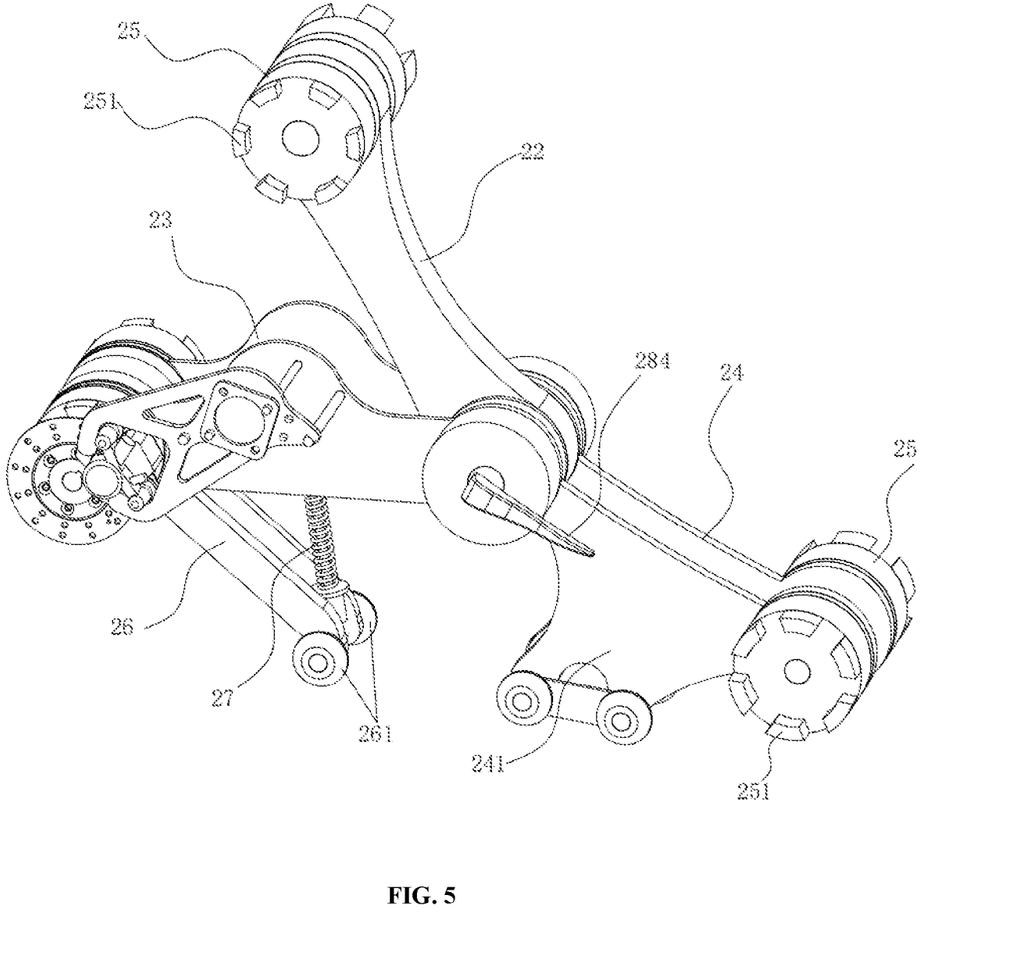
FIG. 5 is a structural view of components in a track body of a tracked vehicle according to an embodiment of the present disclosure.

In one embodiment, the first main support 22 is provided above the second main support 23 and the third main support 24. The second main support 23 is provided in the track body 21 at a position near the front end. The third main support 24 is provided in the track body 21 at a position near the rear end thereof. The first main support 22 and the second main support 23 form an included angle of 60 degrees between them. The second main support 23 and the auxiliary support 26 form an angle of 30 degrees, and the third main support 24 and the first main support 22 form an angle of 160 degrees. In this way, the tracked vehicle can have a better ability to cross obstacles.

In one embodiment, the third main support 24 is provided with a downward convex portion 241. The convex portion 241 is provided with a second roller 242, and the second roller 242 is in contact with the inner side of the track body 21. The height of the second roller 242 is lower than the height of the drive wheel 25 on the third main support 24. In such a design, the contact area between the third main support and the track body is increased by the arrangement of the second roller. The reliability during the operation of the tracked vehicle is improved. The track body forms an angle between the second roller and the drive wheel on the third main support after tensioning by making the height of the second roller lower than the height of the drive wheel on the third main support. In that course of crossing the obstacles, jump of the track vehicle can be avoided.

Preferably, the second rollers 242 are provided with two front and rear groups. Each group includes two second rollers 242, and the two second rollers 242 are connected to two sides of the third main support 24 through a rotating shaft. The connecting shaft is provided on the convex portion 241. A connecting plate 243 is provided between the front and rear groups. Two connecting plates 243 are located at two sides of the third main support 24 and between the second roller 242 and the third main support 24. The rotating shaft passes through the connecting plate 243 and is transitionally engaged with the connecting plate 243. In such a design, the break and separation between the second roller and the third main support can be avoid when the tracked vehicle has a large vibration, the impact bearing ability of the second roller is improved, and the reliability of the tracked vehicle is improved, thus making the tracked vehicle run more safely.

Figure 4:
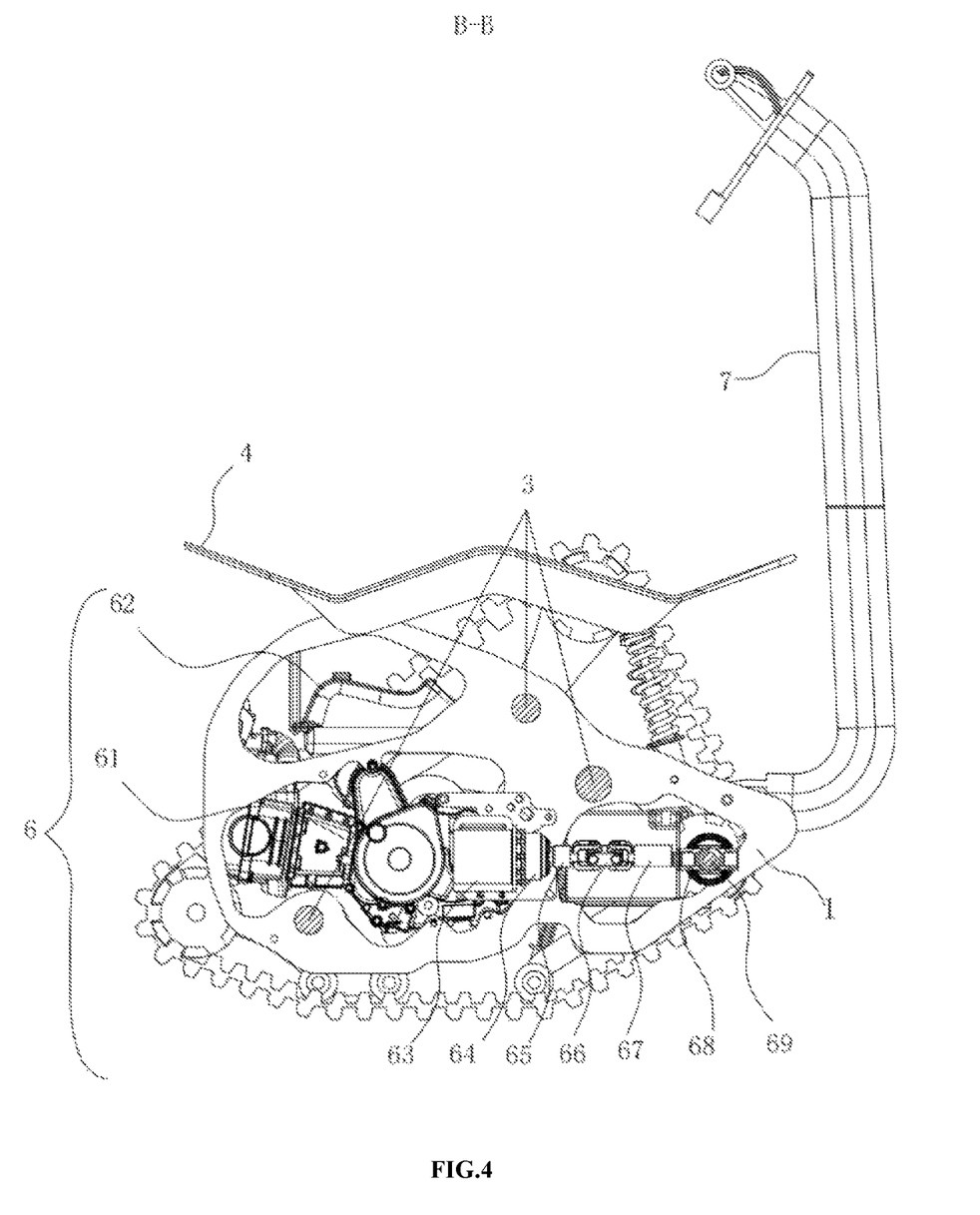
FIG. 4 is a sectional view along the line B-B in FIG. 3.

In an embodiment of the present disclosure, the driving mechanism 6 includes a fuel engine 61 provided in the vehicle frame 1, a fuel tank 62 arranged at the top of the fuel engine 61, a steering gear 63 connected to the output end of the fuel engine 61, a reducer 64 connected to the steering gear 63, a first transmission shaft 65 connected to the reducer 64, and a universal joint 66 connected at one end to the first transmission shaft 65, a second transmission shaft 67 connected to the other end of the universal joint 66, a differential gear 68 connected to the second transmission shaft 67, and a third transmission shaft 69 respectively connected to the two track wheels 2 through the differential gear 68. The third transmission shaft 69 is connected to the transmission wheel 25 on the second main support 23 and drives the transmission wheel 25 on the second main support 23 to rotate. In the design, the fuel engine is used as a power source to make the power of the tracked vehicle stronger and lasting. The steering gear connected at the output end of the fuel engine can adjust the power output direction of the fuel engine. The problem that the rotational axis of the first transmission shaft and the second transmission shaft are not consistent can be solved by connecting the universal joint. In the disclosure, the third transmission shaft drives the driving wheel on the second main support to rotate and drive the track body to generate motion, thereby completing the front-wheel driving arrangement of the tracked vehicle, and making the overall structure of the tracked vehicle simpler.

Preferably, the reducer 64 is a planetary reducer. In such a design, the space size of the reduce can be reduced by using the planetary reducer, and the whole volume of the tracked vehicle can be reduced conveniently.

In one embodiment, the frame 1 is formed by connecting two alloy steel plates. In such a design, the weight of the frame itself is greatly reduced, and the purpose of reducing the weight of the track vehicle is achieved.

Preferably, the bottom of the frame 1 is provided with a bottom plate, and the bottom plate is connected with the two alloy steel plates. In such a design, the protrusion that can be placed on the ground during the operation of the tracked vehicle can cause damage to the objects in the frame.

Figure 1:
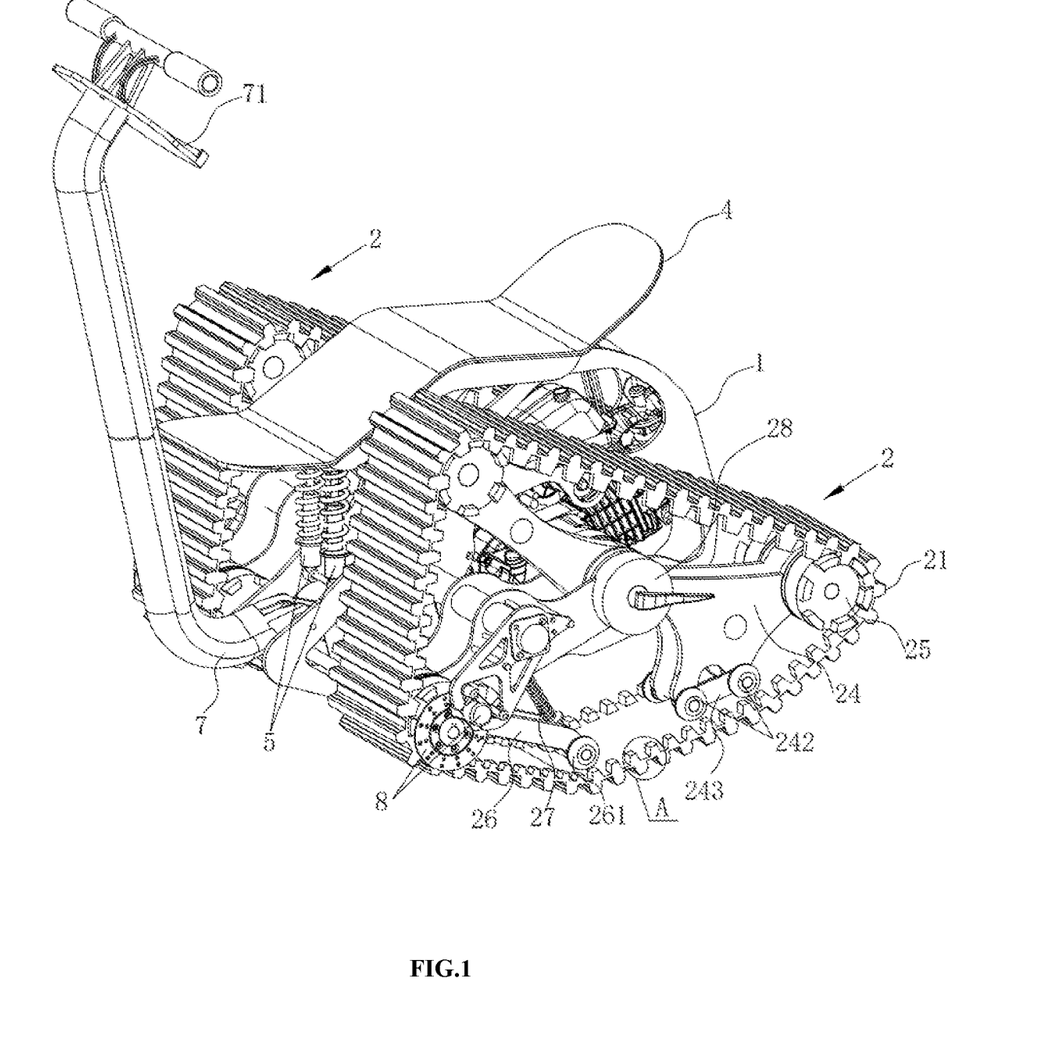
FIG. 1 is a perspective view of a tracked vehicle according to an embodiment of the present disclosure.
Figure 2:
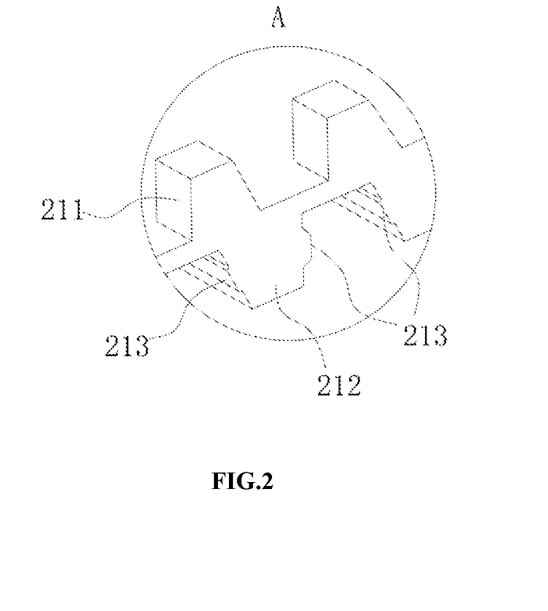
FIG. 2 is an enlarged view of the A in FIG. 1.
Figure 3:
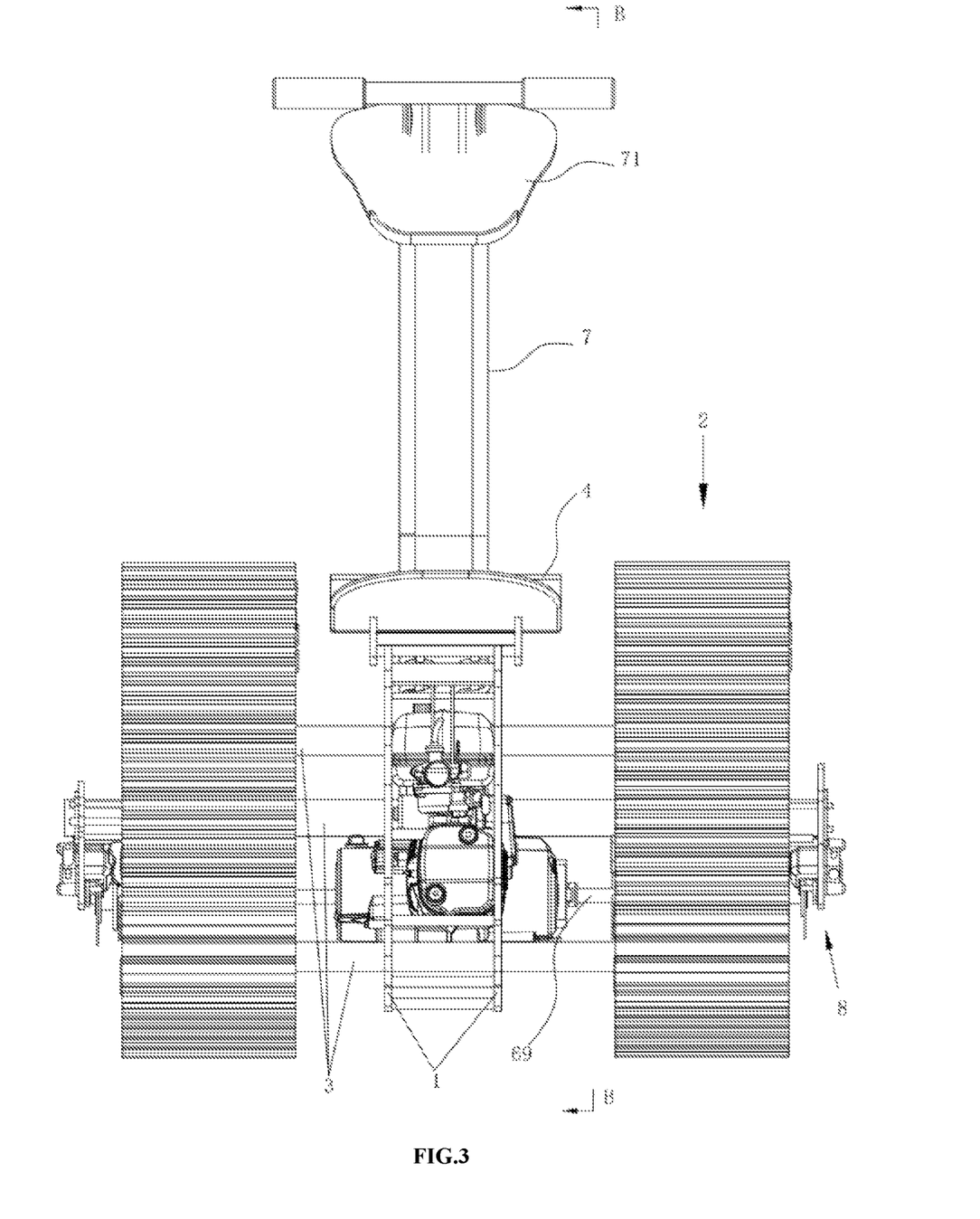
FIG. 3 is a rear view of the tracked vehicle according to an embodiment of the present disclosure.

In one embodiment, the top of the frame 1 is provided with a carrying plate 4, and the rear end of the carrying plate 4 is rotatably installed at the top position of the rear end of the frame 1. A second damper 5 is disposed between the front end of the carrier plate 4 and the front end of the frame 1. In such a design, the vibration of the carrying plate is alleviated by the second damper, so that the tracked vehicle can run smoothly on rough roads.

In one embodiment, two second dampers 5 are provided. In this way, the effect of vibration reduction is further improved and the design is reasonable.

Preferably, the first damper 27 and the second damper 5 are both spring dampers.

In one embodiment, the oil brake system 8 is provided on the drive wheel 25 on the second main support 23. In such a design, since that drive wheel on the second main support is the drive wheel, the arrangement of the oil brake system on the drive wheel on the second main support can better brake the tracked vehicle and reduce the damage of the drive wheel to the track body due to braking.

In one embodiment, the control rod 7 is rotatably installed at the front end of the vehicle frame 1. The control rod 7 is designed as a hollow structure, and an operation console 71 is arranged on the control rod 7. In the design, through the rotate installation of the control rod and the frame, when the tracked vehicle is not in use, the control rod can be rotated to fold the control rod so as to reduce the space occupied by the tracked vehicle. By making the control rod hollow, it can pass through the circuit inside, so that the tracked vehicle looks neat and does not appear to be scattered.

In one embodiment, the lever body of the control rod 7 is of foldable design. This design can further reduce the space occupied by the tracked vehicle, and the design is reasonable.

The foregoing is only a preferred embodiment of the present invention and is not intended to limit the present invention, and any modification, equivalent replacement, improvement, etc. made within the spirit and principle of the present invention, should be included in the scope of protection of the present disclosure.

What is claimed is:

1. A tracked vehicle, comprising a frame, a driving mechanism provided in the frame, and two track wheels respectively arranged on left and right sides of the frame; wherein the driving mechanism is configured to drive the track wheel to rotate; each of the track wheels comprises a track body, a first main support, a second main support and a third main support; the first main support, the second main support and the third main support are respectively connected with a connecting rod; and each connecting rod is connected with the frame;

one end of each of the first main support, the second main support and the third main support is provided with a transmission wheel; an other end of the first main support, the second main support and the third main support are connected to each other; the track body is wound on the transmission wheels; the second main support is provided with an auxiliary supporting frame having one end hinged to the second main support; the other end of the auxiliary supporting frame is provided with a first roller contacting an inside of the track body; a first damper is further provided between the auxiliary supporting frame and the second main support; and a triangular structure is formed between the first damper, the second main support and the auxiliary support;

the other ends of the first main support, the second main support and the third main support are connected to each other by a locking mechanism; the locking mechanism comprises a threaded column and a nut screwed to one end of the threaded column; the other ends of the treaded column are provided with a stop ring; the threaded column is configured to pass through the other ends of the first main support, the second main support and the third main support and screw with the nut to lock the other ends of the first main support, the second main support and the third main support;

the first main support is provided above the second main support and the third main support; the second main support is provided in the track body; and the third main support is provided in the track body; an included angle of 60 degrees is formed between the first main support and the second main support; an included angle of 30 degrees is formed between the second main support and the auxiliary support; and an included angle of 160 degrees is formed between the third main support and the first main support;

the third main support is provided with a downward convex portion; the convex portion is provided with a second roller; the second roller is in contact with the inner side of the track body; and the second roller has a height lower than that of the drive wheel on the third main support.

2. The tracked vehicle of claim 1, wherein the driving mechanism comprises a fuel engine arranged in the vehicle frame, a fuel tank arranged on top of the fuel engine, a steering gear connected to an output end of the fuel engine, a reducer connected to the steering gear, and a first transmission shaft connected to the reducer, a universal joint having one end connected to the first transmission shaft, a second transmission shaft connected to an other end of the universal joint, a differential gear connected to the second transmission shaft and a third transmission shaft respectively connected to the two track wheels through the differential gear; the third transmission shaft is connected with the transmission wheel on the second main support and configured to drive the transmission wheel on the second main support to rotate.

3. The tracked vehicle of claim 2, wherein an oil brake system is arranged on the transmission wheel of the second main support.

4. The tracked vehicle of claim 1, wherein the frame is formed by connecting two alloy steel plates.

5. The tracked vehicle according to claim 1, wherein a top of the frame is provided with a carrying plate; a rear end of the carrying plate is rotatably installed at top position of a rear end of the frame, and a second damper is provided between the front end of the carrying plate and the front end of the frame.

6. The tracked vehicle of claim 5, wherein two second dampers are provided.

7. The tracked vehicle of claim 1, further comprising a control rod rotatably mounted on the front end of the frame; the control rod is of a hollow structure; and an operation console is arranged on the control rod.

8. The tracked vehicle of claim 7, wherein a rod body of the control rod is foldable.

* * * * *